United States Patent
Chae et al.

(10) Patent No.: US 11,929,487 B2
(45) Date of Patent: Mar. 12, 2024

(54) METHOD OF PREPARING NEGATIVE ELECTRODE FOR LITHIUM SECONDARY BATTERY

(71) Applicant: LG CHEM, LTD., Seoul (KR)

(72) Inventors: Oh Byong Chae, Daejeon (KR); Sang Wook Woo, Daejeon (KR); Je Young Kim, Daejeon (KR); Yoon Ah Kang, Daejeon (KR); Jun Hyuk Song, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 258 days.

(21) Appl. No.: 16/771,601

(22) PCT Filed: Jan. 25, 2019

(86) PCT No.: PCT/KR2019/001126
§ 371 (c)(1),
(2) Date: Jun. 10, 2020

(87) PCT Pub. No.: WO2019/147084
PCT Pub. Date: Aug. 1, 2019

(65) Prior Publication Data
US 2020/0303722 A1    Sep. 24, 2020

(30) Foreign Application Priority Data

Jan. 25, 2018    (KR) .................. 10-2018-0009254

(51) Int. Cl.
*H01M 4/134*    (2010.01)
*H01M 4/02*    (2006.01)
*H01M 4/133*    (2010.01)
*H01M 4/1393*    (2010.01)
*H01M 4/1395*    (2010.01)
*H01M 4/36*    (2006.01)
*H01M 4/66*    (2006.01)
*H01M 10/0525*    (2010.01)
*H01M 50/46*    (2021.01)

(52) U.S. Cl.
CPC .......... *H01M 4/134* (2013.01); *H01M 4/133* (2013.01); *H01M 4/1393* (2013.01); *H01M 4/1395* (2013.01); *H01M 4/364* (2013.01); *H01M 4/661* (2013.01); *H01M 10/0525* (2013.01); *H01M 50/46* (2021.01); *H01M 2004/021* (2013.01); *H01M 2004/027* (2013.01)

(58) Field of Classification Search
CPC .... H01M 4/134; H01M 4/133; H01M 4/1393; H01M 4/1395; H01M 4/364; H01M 4/661; H01M 4/043; H01M 4/04; H01M 4/139; H01M 4/1391; H01M 10/0525; H01M 2004/021; H01M 2004/027
See application file for complete search history.

(56) References Cited

U.S. PATENT DOCUMENTS

| | | |
|---|---|---|
| 6,001,139 A | 12/1999 | Asanuma et al. |
| 2005/0130043 A1 | 6/2005 | Gao et al. |
| 2009/0148773 A1 | 6/2009 | Volkov et al. |
| 2012/0202112 A1* | 8/2012 | Yushin ................ H01M 4/463 429/246 |
| 2014/0310951 A1 | 10/2014 | Grant et al. |
| 2015/0333385 A1 | 11/2015 | Sun et al. |
| 2015/0364795 A1 | 12/2015 | Stefan et al. |
| 2016/0141596 A1 | 5/2016 | Uhm et al. |
| 2017/0062815 A1* | 3/2017 | Zhong ................ H01M 4/382 |
| 2017/0271723 A1* | 9/2017 | Huang ............ H01M 10/0525 |
| 2017/0301910 A1 | 10/2017 | Wang et al. |
| 2018/0040914 A1 | 2/2018 | Grant et al. |

FOREIGN PATENT DOCUMENTS

| | | |
|---|---|---|
| CN | 1177417 A | 3/1998 |
| CN | 105190958 A | 12/2015 |
| JP | 4016427 B2 | 12/2007 |
| JP | 2016-511916 A | 4/2016 |
| JP | 2016-191102 A | 11/2016 |
| JP | 2016191102 A * | 11/2016 |
| KR | 10-2006-0056969 A | 5/2006 |
| KR | 10-1028657 B1 | 4/2011 |

(Continued)

OTHER PUBLICATIONS

Machine translation of KR 101274495 B1 (cited on IDS of Jun. 10, 2020). (Year: 2013).*
Holtstiege, Florian; Bärmann, Peer; Nölle, Roman; Winter, Martin; Placke, Tobias. "Pre-lithiation Strategies for Rechargeable Energy Storage Technologies: Concepts, Promises and Challenges." Jan. 23, 2018. MDPI. Batteries, 4, 4. pp. 9-13. (Year: 2018 ).*
Espacenet machine translation of JP2016191102A (Year: 2016).*
International Search Report for PCT/KR2019/001126 (PCT/ISA/210) dated May 10, 2019.
Zhaohua et al., "Applied Surface Chemistry," 3rd Edition (Revised Edition), Harbin Institute of Technology Press, ISBN 978-7-5603-1439-6, Feb. 2009, pp. 195-197 (15 pages total) with an English translation.

(Continued)

*Primary Examiner* — Allison Bourke
*Assistant Examiner* — Katharine A Caughron
(74) *Attorney, Agent, or Firm* — Birch, Stewart, Kolasch & Birch, LLP

(57) ABSTRACT

A method of preparing a negative electrode for a lithium secondary battery, which includes forming a negative electrode mixture layer including a negative electrode active material on a negative electrode current collector, disposing lithium metal powder on at least a part of the negative electrode mixture layer, pressing the negative electrode mixture layer on which the lithium metal powder is disposed, wetting the pressed negative electrode mixture layer with a first electrolyte solution, and drying the wet negative electrode mixture layer. A battery including the negative electrode of the present invention has enhanced rapid charge/discharge characteristics and enhanced lifespan characteristics.

7 Claims, No Drawings

(56) References Cited

FOREIGN PATENT DOCUMENTS

| | | |
|---|---|---|
| KR | 10-2012-0073603 A | 7/2012 |
| KR | 10-2012-0092529 A | 8/2012 |
| KR | 10-1274495 B1 | 6/2013 |
| KR | 10-2015-0014676 A | 2/2015 |
| KR | 10-2015-0014877 A | 2/2015 |
| KR | 10-2015-0051046 A | 5/2015 |
| KR | 10-2016-0066161 A | 6/2016 |
| KR | 10-2017-0020850 A | 2/2017 |
| KR | 10-2017-0061677 A | 6/2017 |
| KR | 10-2017-0111513 A | 10/2017 |
| WO | WO-2017139477 A1 * | 8/2017 .......... H01M 10/052 |

* cited by examiner

METHOD OF PREPARING NEGATIVE ELECTRODE FOR LITHIUM SECONDARY BATTERY

TECHNICAL FIELD

Cross-Reference to Related Application

This application claims priority to and the benefit of Korean Patent Application No. 10-2018-0009254, filed on Jan. 25, 2018, the disclosure of which is incorporated herein by reference in its entirety.

Technical Field

The present invention relates to a method of preparing a negative electrode for a lithium secondary battery. More particularly, the present invention relates to a method of preparing a negative electrode for a lithium secondary battery including a pre-lithiation process.

BACKGROUND ART

According to technology development and increasing demand for various devices, the demand for a secondary battery as an energy source is rapidly increasing, and among secondary batteries, a lithium secondary battery having a high energy density, a high voltage, a long cycle lifespan and a low self-discharge rate has been commercialized and widely used.

The lithium secondary battery generally uses, as a positive electrode active material, a lithium-containing cobalt oxide ($LiCoO_2$) with a layered crystal structure, a lithium-containing manganese oxide such as $LiMnO_2$ with a layered crystal structure or $LiMn_2O_4$ with a spinel crystal structure, or a lithium-containing nickel oxide ($LiNiO_2$). In addition, as a negative electrode active material, a carbon-based material is usually used, and recently, due to growing demand for a high-capacity secondary battery, a silicon-based material or silicon oxide-based material, which has an effective capacity at least 10 times higher than a carbon-based material, has been suggested to be used in combination with the carbon-based material.

However, a lithium secondary battery has various problems, and some of the problems relate to the preparation and operation characteristics of a negative electrode.

For example, in the case of a carbon-based negative electrode active material, since a solid electrolyte interface (SEI) layer is formed on the surface of the negative electrode active material during initial charging/discharging (activation), an initial irreversible phenomenon may occur, and problems of disrupting the SEI layer during continuous charging/discharging, and reducing battery capacity due to depletion of an electrolyte solution during regeneration may also occur.

Moreover, since a silicon-based material exhibits high capacity, but as a cycle progresses, has a volume expansion rate of 300% or more, leading to an increase in resistance and side reactions with an electrolyte, problems caused by the formation of the SEI layer, for example, damage to an electrode structure, may be aggravated.

Compared with a silicon-based material, since a silicon oxide-based material has a low volume expansion rate and excellent durability and lifespan characteristics, it can also be considered for use as a negative electrode active material. However, a silicon oxide-based material also has a problem of high initial irreversibility because of the formation of an SEI layer during charging and $Li_2O$ due to oxygen generated in the active material.

To solve the problems, studies on a method of replacing oxygen in a silicon oxide-based material resulting from high irreversible capacity with lithium oxide by performing pre-lithiation of a silicon oxide-based material are actively progressing. While extending a lifespan by reducing initial irreversibility of a silicon oxide-based material, this method generates a lot of by-products in pre-lithiation of the silicon oxide-based material with a lithium source and produces lithium oxide almost only on the surface of the silicon oxide-based material, and therefore, there is a limit to reducing irreversibility.

Recently, to solve this problem, there has been an attempt to enhance a cycle characteristic by completely reducing early irreversibility through pre-lithiation by putting a negative electrode into a lithium source-containing solution and applying a current thereto, but this attempt failed and there are no proposed alternatives for the above-described problem.

PRIOR ART LITERATURE

Patent Literature

Korean Unexamined Patent Application Publication No. 10-2012-0092529

DISCLOSURE

Technical Problem

The present invention is directed to providing a method of preparing a negative electrode for a lithium secondary battery which is able to enhance rapid charge/discharge characteristics and a lifespan characteristic.

Technical Solution

The present invention provides a method of preparing a negative electrode for a lithium secondary battery, which includes: forming a negative electrode mixture layer including a negative electrode active material on a negative electrode current collector; disposing lithium metal powder on at least a part of the negative electrode mixture layer; pressing the negative electrode mixture layer on which the lithium metal powder is disposed; wetting the pressed negative electrode mixture layer with a first electrolyte solution; and drying the wet negative electrode mixture layer.

In the disposition of lithium metal powder, the lithium metal powder may be disposed on at least a part of the negative electrode mixture layer in two or more pattern shapes spaced apart from each other.

The thickness of the pattern shape may be 10 to 200 μm.

The area in which the lithium metal powder is disposed on the negative electrode mixture layer may be 23 to 100% with respect to the total area of the surface of the negative electrode mixture layer.

The average particle size ($D_{50}$) of the lithium metal powder may be 3 to 160 μm.

In the disposition of lithium metal powder, the lithium metal powder may be disposed at 3 to 50 parts by weight on at least a part of the negative electrode mixture layer with respect to 100 parts by weight of the negative electrode mixture layer.

The negative electrode active material may include one or more selected from the group consisting of a carbon-based material and a silicon-based material.

The carbon-based material may be one or more selected from the group consisting of crystalline artificial graphite, crystalline natural graphite, amorphous hard carbon, low crystalline soft carbon, carbon black, acetylene black, Ketjen black, Super P, graphene, and fibrous carbon.

The silicon-based material may be $SiO_x$ ($0 \leq x < 2$).

In addition, the present invention provides a method of producing a lithium secondary battery, which includes: preparing a negative electrode for a lithium secondary battery prepared by the method of preparing a negative electrode for a lithium secondary battery; preparing a positive electrode for a lithium secondary battery; and interposing a separator between the negative electrode for a lithium secondary battery and the positive electrode for a lithium secondary battery.

The method of producing a lithium secondary battery may further include injecting a second electrolyte solution into the negative electrode for a lithium secondary battery and the positive electrode for a lithium secondary battery.

Advantageous Effects

A method of preparing a negative electrode for a lithium secondary battery of the present invention includes a pre-lithiation process, and the pre-lithiation is performed through a wetting process with an electrolyte solution before the assembly of a negative electrode, not by preparing an electrode assembly using a negative electrode coated with lithium metal powder and then injecting an electrolyte solution. Therefore, according to the method of preparing a negative electrode for a lithium secondary battery of the present invention, since the electrode assembly is prepared using the negative electrode which was previously subjected to pre-lithiation, a void formed by ionizing the lithium metal powder can be reduced, the structural stability of a cell can be enhanced, and the rapid charge/discharge characteristics, output characteristic and cycle characteristic of a battery can be enhanced.

MODES OF THE INVENTION

Hereinafter, the present invention will be described in further detail to help in understanding the present invention.

Hereinafter, the present invention will be described in further detail to help understanding of the present invention. Here, terms and words used in the specification and claims should not be construed as limited to general or dictionary meanings, and should be interpreted with the meaning and concept in accordance with the technical idea of the present invention based on the principle that the inventors have appropriately defined the concepts of terms in order to explain the invention in the best way.

The terms used in the specification are used only to explain specific examples, not to limit the present invention. Singular expressions include plural referents unless clearly indicated otherwise in the context.

The terms "include" and "have" used herein designate the presence of characteristics, numbers, stages, components or a combination thereof, and it should be understood that the possibility of the presence or addition of one or more other characteristics, numbers, stages, components, or a combination thereof is not excluded in advance.

Method of Preparing Negative Electrode for Lithium Secondary Battery

The present invention provides a method of preparing a negative electrode for a lithium secondary battery.

Specifically, the present invention provides a method of preparing a negative electrode for a lithium secondary battery, which includes: forming a negative electrode mixture layer including a negative electrode active material on a negative electrode current collector; disposing lithium metal powder on at least a part of the negative electrode mixture layer; pressing the negative electrode mixture layer on which the lithium metal powder is disposed; wetting the pressed negative electrode mixture layer with a first electrolyte solution; and drying the wet negative electrode mixture layer.

Usually, the pre-lithiation of a negative electrode is carried out by preparing an electrode assembly by assembling a negative electrode, which is prepared by spraying lithium metal powder on a negative electrode active material and then pressing the resulting negative electrode active material, together with a positive electrode and a separator, and then injecting an electrolyte solution into the electrode assembly. However, as the lithium metal powder in the negative electrode is dissolved in the electrolyte solution, a pore or a void may be formed in the pressed negative electrode, causing the distortion of an electrode cell, and deterioration of the charge/discharge characteristics and cycle characteristic of a battery.

However, according to the method of preparing a negative electrode for a lithium secondary battery according to the present invention, the electrode assembly is prepared by performing pre-lithiation by wetting the pressed negative electrode mixture layer with an electrolyte and drying the wet negative electrode mixture layer in the preparation of a negative electrode, rather than performing pre-lithiation by injecting an electrolyte after forming the electrode assembly. Therefore, according to the method of preparing a negative electrode for a lithium secondary battery according to exemplary embodiments, the formation of a void in the surface of an electrode and a cell distortion phenomenon, caused by the elimination of the lithium metal powder through ionization by injecting an electrolyte solution after the preparation of the electrode assembly, may be prevented, and therefore, the rapid charge/discharge characteristics and the cycle characteristic of a lithium secondary battery may be enhanced.

The method of preparing a negative electrode for a lithium secondary battery according to the present invention will be described in detail.

The method of preparing a negative electrode for a lithium secondary battery includes forming a negative electrode mixture layer including a negative electrode active material on a negative electrode current collector.

The negative electrode current collector is not particularly limited as long as it has high conductivity without causing a chemical change in a battery, and may be, specifically, copper, stainless steel, aluminum, nickel, titanium, calcined carbon, copper or stainless steel whose surface is treated with carbon, nickel, titanium or silver, or an aluminum-cadmium alloy.

The negative electrode current collector may have various forms, such as a film, a sheet, a foil, a net, a porous body, a foam, a non-woven fabric, etc.

In addition, the negative electrode current collector may have a thickness of 3 to 500 µm, preferably, 4 to 400 µm, and more preferably 5 to 300 µm. The thickness of the negative electrode current collector is not necessarily limited within the above range, which may vary depending on the total capacity of the negative electrode for a lithium secondary battery.

The negative electrode mixture layer includes a negative electrode active material.

The negative electrode active material may include a carbon-based material and/or a silicon-based material.

More specifically, the carbon-based material may be one or more carbon-based materials selected from the group consisting of crystalline artificial graphite, crystalline natural graphite, amorphous hard carbon, low crystalline soft carbon, carbon black, acetylene black, Ketjen black, Super P, graphene, and fibrous carbon, and preferably, crystalline artificial graphite, crystalline natural graphite, and a mixture of the crystalline artificial graphite and the crystalline natural graphite.

Meanwhile, the silicon-based material may be $SiO_x$ ($0 \leq x < 2$), and since $SiO_2$ may not react with a lithium ion and thus not store lithium, x is preferably in the above range. More preferably, the silicon-based material may be SiO.

The negative electrode mixture layer may further include a binder and/or a conductive material.

The binder is used to enhance the performance of a battery by enhancing the adhesive strength between a negative electrode active material layer and the current collector, and may be, for example, at least one selected from the group consisting of a polyvinylidenefluoride-hexafluoropropylene copolymer (PVDF-co-HFP), polyvinylidenefluoride (PVDF), polyacrylonitrile, polymethylmethacrylate, polyvinylalcohol, carboxymethylcellulose (CMC), starch, hydroxypropylcellulose, regenerated cellulose, polyvinylpyrrolidone, tetrafluoroethylene, polyethylene, polypropylene, polyacrylic acid, an ethylene-propylene-diene monomer (EPDM), sulfonated EPDM, styrene butadiene rubber (SBR), fluoro rubber, and the above-mentioned materials in which hydrogen is substituted with Li, Na or Ca, and various copolymers thereof.

The conductive material is not particularly limited as long as it has conductivity without causing a chemical change in a battery, and for example, graphite such as natural graphite or artificial graphite; carbon black such as acetylene black, Ketjen black, channel black, furnace black, lamp black or thermal black; a conductive fiber such as a carbon fiber or a metal fiber; a conductive tube such as a carbon nanotube; metal powder such as fluorocarbon powder, aluminum powder or nickel powder; a conductive whisker consisting of zinc oxide or potassium titanate; a conductive metal oxide such as titanium oxide; or a conductive material such as a polyphenylene derivative may be used.

The negative electrode mixture layer may further include a thickening agent to adjust a viscosity. The thickening agent may be a cellulose-based compound, for example, one or more selected from the group consisting of carboxymethylcellulose (CMC), hydroxy methylcellulose, hydroxy ethyl cellulose and hydroxy propyl cellulose, and preferably CMC, and the negative electrode active material, the binder and/or the conductive material may be dispersed in water with the thickening agent so as to be applied to the negative electrode mixture layer.

The thickness of the negative electrode mixture layer may be 10 to 100 μm, and preferably 50 to 80 μm.

The method of preparing a negative electrode for a lithium secondary battery may include disposing lithium metal powder on at least a part of the negative electrode mixture layer.

As the method of preparing a negative electrode for a lithium secondary battery according to the present invention includes adding lithium metal powder to perform pre-lithiation, a side reaction occurring during first charging may be experienced in advanced, and initial irreversibility caused by the formation of an SEI layer on the surface of the negative electrode active material may be improved.

According to the method of preparing a negative electrode for a lithium secondary battery, lithium metal powder may be disposed on at least a part of the negative electrode mixture layer. For example, the negative electrode active material may be brought into contact with or face the lithium metal powder by spraying, loading or disposing the lithium metal powder on at least a part of the negative electrode mixture layer. Specifically, the lithium metal powder may be disposed on the negative electrode mixture layer by spraying, but the present invention is not limited thereto.

The lithium metal powder may be disposed on at least a part of the negative electrode mixture layer.

In the disposition of lithium metal powder, the lithium metal powder may be disposed on at least a part of the negative electrode mixture layer in two or more pattern shapes spaced apart from each other. In an exemplary embodiment, the lithium metal powder may be disposed on the negative electrode mixture layer in two or more pattern shapes spaced apart from each other according to rows and columns at predetermined intervals. In this case, since the lithium metal powder is disposed in two or more pattern shapes spaced apart from each other, rather than disposing the lithium metal powder to entirely cover the negative electrode mixture layer, the disposed metal powder in the compressing of a negative electrode, which will be described below, may be prevented from becoming excessively agglomerated or coagulated at a specific position, and uniformly distributed on the negative electrode mixture layer. In addition, during the pre-lithiation by the impregnating with an electrolyte solution, a lithium ion may be uniformly added to an active material or negative electrode mixture layer in an electrode and at a suitable rate to prevent damage to the active material and the electrode.

A shape of the pattern is not particularly limited, and may be, for example, a round, square or triangular shape.

The thickness of the pattern shape may be 10 to 200 μm, preferably 30 to 100 μm, and more preferably 40 to 80 μm. Within the above range, the pattern shape is preferable in terms of uniformly distributing the lithium metal powder on the surface or in the negative electrode mixture layer in pressing to be described below.

The pattern formation may be performed by disposing a window having a pattern shape on the electrode, spraying lithium metal powder through the window, and removing the window, but the present invention is not limited.

The area in which the lithium metal powder is disposed may be 23 to 100%, and preferably 30 to 80%, with respect to the total area of the surface of the negative electrode mixture layer, and when the area is included in the above range, in the pre-lithiation, lithium of the lithium metal powder may be intercalated into the surface or the inside of the negative electrode mixture layer to be uniformly distributed, damage to the negative electrode and the cell distortion phenomenon, which are caused by too much localization of lithium at a specific position of the negative electrode mixture layer, may be prevented, thereby enhancing the structural stability and cycle characteristic of a cell. More preferably, the area in which the lithium metal powder is disposed may be 50 to 70% with respect to the total area of the surface of the negative electrode mixture layer, and within the above range, the cycle characteristic of a battery may be further enhanced, and the irreversible capacity of the negative electrode may be removed to a significant extent, thereby further enhancing the initial efficiency.

The average particle size ($D_{50}$) of the lithium metal powder may be 3 to 160 μm, preferably, 10 to 100 μm, and more preferably, 20 to 80 μm. When the average particle size ($D_{50}$) is in the above range, the surface area of the lithium metal powder may be adjusted to an appropriate level to lower the possibility of a side reaction between the lithium metal powder and the electrolyte solution and further enhance the cycle characteristic, and the ionization of the lithium metal powder may be sufficiently performed, thereby smoothly performing the pre-lithiation. Even more preferably, the average particle size ($D_{50}$) of the lithium metal powder may be 30 to 50 μm, and within the above range, the ionization of the lithium metal powder may be more smoothly performed, so that the irreversible capacity of the negative electrode may be eliminated to a superior level, thereby enhancing the initial efficiency and the cycle characteristic.

In the specification, the average particle size ($D_{50}$) may be defined as a particle size corresponding to 50% in a cumulative volume-based particle size distribution curve. The average particle size ($D_{50}$) may be measured, for example, using a laser diffraction method. The laser diffraction method generally enables measurement of a particle size in a range from about submicrons to several mm, and may obtain a result with high reproducibility and high resolution.

In the disposition of the lithium metal powder, in consideration of the capacity balance with a positive electrode also assembled in a secondary battery, the lithium metal powder may be disposed on at least a part of the negative electrode mixture layer at 3 to 50 parts by weight, and preferably 4 to 20 parts by weight, with respect to 100 parts by weight of the negative electrode mixture layer. Within the above range, lithium is intercalated into the negative electrode active material at an appropriate level to enhance the effect of improving initial irreversibility by pre-lithiation, and the volume expansion and structural damage of the negative electrode active material by the excessively intercalation of lithium into the negative electrode active material, the capacity imbalance between the negative electrode and the positive electrode, and the resulting lithium precipitation on the surface of the negative electrode may be prevented. More preferably, the lithium metal powder may be disposed on at least a part of the negative electrode mixture layer at 4.5 to 8 parts by weight with respect to 100 parts by weight of the negative electrode mixture layer, and within the above range, since the capacity of the negative and positive electrodes can be balanced, the initial efficiency and the cycle characteristic of the battery may be further improved.

The method of preparing a negative electrode for a lithium secondary battery includes pressing the negative electrode mixture layer on which the lithium metal powder is disposed.

Throughout the pressing process, the lithium metal powder may be alloyed with the negative electrode active material, or may be inserted and distributed in the negative electrode mixture layer.

The pressing process may be performed using a roll press, but the present invention is not limited thereto.

The pressure applied to the pressing process may be a nip pressure, which is applied at 0.2 to 30 kN/cm, and preferably, 0.5 to 10 kN/cm. When the negative electrode mixture layer is pressed within the above-described pressure range, the lithium metal powder may be easily and evenly distributed and inserted into the negative electrode mixture layer, and the negative electrode mixture layer may not experience deformation, for example, damage or a change in porosity due to an excessively high pressure.

The method of preparing a negative electrode for a lithium secondary battery includes preparing a negative electrode for a lithium secondary battery by wetting the pressed negative electrode mixture layer with a first electrolyte solution.

For example, in the method of preparing a negative electrode for a lithium secondary battery according to the present invention, rather than producing a lithium secondary battery by preparing an electrode assembly by assembling pressed negative electrode, positive electrode and separator and then injecting an electrolyte solution, individually, the pressed negative electrode mixture layer is previously wetted with the first electrolyte solution during the preparation of a negative electrode. Therefore, according to the method of preparing a negative electrode for a lithium secondary battery according to exemplary embodiments, as lithium metal powder may be uniformly distributed, and then ionized and diffused in an electrolyte solution, the formation of a void may be effectively prevented, and accordingly, the rapid charge/discharge characteristics and the cycle characteristic of the lithium secondary battery may be enhanced.

The first electrolyte solution may include a first electrolyte and a first non-aqueous organic solvent, which are conventionally applied to a negative electrode for a secondary battery, without limitation.

The lithium salt included as the first electrolyte, which is used herein, may be any one which is conventionally used for an electrolyte for a lithium secondary battery without limitation, and for example, any one selected from the group consisting of $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be used as an anion of the lithium salt.

As the non-aqueous organic solvent included in the first electrolyte solution, those conventionally used in an electrolyte solution for a secondary battery may be used without limitation, and representatively, any one or a mixture of two or more selected from the group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulfolane, γ-butyrolactone, propylene sulfite and tetrahydrofuran may be used. Specifically, among the carbonate-based organic solvents, cyclic carbonates, such as ethylene carbonate and propylene carbonate, are preferably used, because these are organic solvents with a high viscosity and high permittivity, which easily dissolve a lithium salt in an electrolyte. When a cyclic carbonate is mixed with a linear carbonate with low viscosity and low permittivity, such as dimethyl carbonate or diethyl carbonate, in a suitable ratio, an electrolyte solution having high electric conductivity may be prepared. For this reason, the resulting carbonate mixture is more preferably used.

Optionally, the first electrolyte solution according to the present invention may further include an additive such as an overcharge inhibitor included in a conventional electrolyte solution.

There is no particular limitation to a time for wetting the first electrolyte solution, but the wetting with the first electrolyte solution may be performed for 20 to 80 minutes in consideration of sufficient ionization and pre-lithiation of the lithium metal powder.

The method of preparing a negative electrode for a lithium secondary battery includes drying the wet negative electrode mixture layer.

In the method of preparing a negative electrode for a lithium secondary battery, pre-lithiation is carried out by performing the first electrolyte solution wetting and drying processes after the lithium metal powder is disposed on the negative electrode mixture layer. Therefore, compared with the conventional method in which pre-lithiation is carried out by injecting an electrolyte solution after the preparation of an electrode assembly, this method is able to reduce pore generation which may be caused by dissolving the lithium metal powder after the preparation of the electrode assembly, reduce an electrode distortion phenomenon, and further enhance a degree of ionization of the lithium metal powder in the active material layer.

There is no particular limitation on the drying method, which may be, for example, a lukewarm and natural drying method. The drying may be suitably adjusted with respect to a content of the negative electrode active material or electrolyte solution, and may be performed at, for example, 25 to 60° C. for 10 to 180 minutes.

Method of Producing Lithium Secondary Battery

In addition, the present invention provides a method of producing a lithium secondary battery, which includes the above-described negative electrode for a lithium secondary battery.

The method of producing a lithium secondary battery according to the present invention includes preparing the negative electrode for a lithium secondary battery prepared from the above-described method of preparing a negative electrode for a lithium secondary battery; preparing a positive electrode for a lithium secondary battery; and interposing a separator between the negative electrode for a lithium secondary battery and the positive electrode for a lithium secondary battery.

Since the negative electrode for a lithium secondary battery may be a negative electrode which has been previously subjected to wetting with an electrolyte solution and drying, the lithium metal powder is ionized and distributed on the surface of or in the negative electrode mixture layer without having a pore. For this reason, the negative electrode for a lithium secondary battery is preferable in terms of the rapid charge/discharge characteristics and cycle characteristic of the battery.

The negative electrode for a lithium secondary battery may be prepared by the above-described method of preparing a negative electrode for a lithium secondary battery.

The positive electrode for a lithium secondary battery may include a positive electrode current collector, and a positive electrode mixture layer which is formed on the positive electrode current collector and includes the positive electrode active material.

In the positive electrode for a lithium secondary battery, the positive electrode current collector is not particularly limited as long as it has high conductivity without causing a chemical change in a battery, and may be, for example, stainless steel, aluminum, nickel, titanium, calcined carbon, or aluminum or stainless steel whose surface is treated with carbon, nickel, titanium or silver. In addition, the positive electrode current collector may generally have a thickness of 3 to 500 μm, and the adhesive strength of the positive electrode active material may be increased by forming fine irregularities in the surface of the current collector. For example, the positive electrode current collector may be used in various forms such as a film, a sheet, a foil, a net, a porous body, a foam, a non-woven fabric, etc.

The positive electrode active material is not particularly limited, and may be, for example, a generally used positive electrode active material. Specifically, the positive electrode active material may be a layered compound such as lithium cobalt oxide ($LiCoO_2$) or lithium nickel oxide ($LiNiO_2$) or a compound substituted with one or more transition metals; lithium iron oxide such as $LiFe_3O_4$; a lithium manganese oxide represented by $Li_{1+c1}Mn_{2-c1}O_4$ ($0 \leq c1 \leq 0.33$), such as $LiMnO_3$, $LiMn_2O_3$, or $LiMnO_2$; lithium copper oxide ($Li_2CuO_2$); a vanadium oxide such as $LiV_3O_8$, $V_2O_5$, or $Cu_2V_2O_7$; an Ni-site lithium nickel oxide represented by $LiNi_{1-c2}M_{c2}O_2$ (wherein M is at least any one selected form the group consisting of Co, Mn, Al, Cu, Fe, Mg, B and Ga, and satisfies $0.01 \leq c2 \leq 0.3$); a lithium manganese composite oxide represented by $LiMn_{2-c3}M_{c3}O_2$ (wherein M is at least any one selected form the group consisting of Co, Ni, Fe, Cr, Zn and Ta, and satisfies $0.01 \leq c3 \leq 0.1$) or $Li_2Mn_3MO_8$ (wherein M is at least any one selected from the group consisting of Fe, Co, Ni, Cu and Zn); or $LiMn_2O_4$ in which some Li ions therein are substituted with alkaline earth metal ions, but the present invention is not limited thereto. The positive electrode may be a lithium metal or a lithium metal foil.

The positive electrode mixture layer may further include a positive electrode conductive material and a positive electrode binder, in addition to the above-described positive electrode active material.

Here, the positive electrode conductive material is used to impart conductivity to the electrode, and is not particularly limited as long as it has conductivity without causing a chemical change in a battery. As a specific example, the positive electrode conductive material may be graphite such as natural graphite or artificial graphite; a carbon-based material such as carbon black, acetylene black, Ketjen black, channel black, furnace black, lamp black, thermal black, or a carbon fiber; a metal powder or fiber of copper, nickel, aluminum or silver; a conductive whisker of zinc oxide or potassium titanate; a conductive metal oxide such as titanium oxide; or a conductive polymer such as a polyphenylene derivative, which may be used alone or in combination with two or more thereof.

In addition, the positive electrode binder serves to facilitate binding between particles of the positive electrode active material, and enhance the adhesive strength between the positive electrode active material and the positive electrode current collector. As a specific example, the positive electrode binder may be PVDF, PVDF-co-HFP, polyvinylalcohol, polyacrylonitrile, CMC, starch, hydroxypropylcellulose, regenerated cellulose, polyvinylpyrrolidone, tetrafluoroethylene, polyethylene, polypropylene, EPDM, sulfonated-EPDM, SBR, fluororubber, or various copolymers thereof, which may be used alone or in combination with two or more thereof.

As a separator, any one which can be generally used as a separator in a secondary battery to separate a negative electrode from a positive electrode and provide a migration path of lithium ions is able to be used without particular limitations, and particularly, a separator having low resistance to the ion migration in an electrolyte and excellent wettability of an electrolyte is preferable. Specifically, the separator may be a porous polymer film, for example, a porous polymer film prepared of a polyolefin-based polymer, such as an ethylene homopolymer, a propylene homopolymer, an ethylene/butene copolymer, an ethylene/hexene copolymer or an ethylene/methacrylate copolymer, or a stacked structure with two or more layers thereof. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively formed in a single- or multi-layered structure.

The method of producing a lithium secondary battery may further include injecting a second electrolyte solution into the negative electrode for a lithium secondary battery and the positive electrode for a lithium secondary battery.

For example, the second electrolyte solution may include a secondary non-aqueous organic solvent and a second electrolyte.

The second electrolyte may be an organic liquid electrolyte, an inorganic liquid electrolyte, a solid polymer electrolyte, a gel-type polymer electrolyte, a solid inorganic electrolyte, or a melt-type inorganic electrolyte, which can be used in production of a lithium secondary battery, but the present invention is not limited thereto.

As the second electrolyte, a lithium salt may be used. The lithium salt is a material which is able to be easily dissolved in the non-aqueous electrolyte solution, and for example, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be used as an anion of the lithium salt.

To enhance a lifespan characteristic of the battery, inhibit a decrease in battery capacity, and enhance discharge capacity of the battery, the electrolyte may further include one or more additives selected from the group consisting of, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte.

As the second non-aqueous organic solvent, for example, an aprotic organic solvent such as N-methyl-2-pyrrolidone, propylene carbonate, ethylene carbonate, butylene carbonate, dimethyl carbonate, diethyl carbonate, γ-butylo lactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, or ethyl propionate may be used.

Particularly, among the carbonate-based organic solvents, cyclic carbonates, such as ethylene carbonate and propylene carbonate, are organic solvents with high viscosity, and are preferably used because they easily dissolve a lithium salt due to high permittivity. When a cyclic carbonate is mixed with a linear carbonate with low viscosity and low permittivity, such as dimethyl carbonate or diethyl carbonate in a suitable ratio, an electrolyte having high electric conductivity may be prepared. For this reason, the resulting carbonate mixture is more preferably used.

Since the lithium secondary battery produced by the method of producing a lithium secondary battery stably exhibits excellent rapid charge/discharge characteristics and an excellent cycle characteristic, it is useful in portable devices such as a mobile phone, a notebook computer, a digital camera, etc., and the field of an electric automobile such as a hybrid electric vehicle (HEV), etc.

According to some other exemplary embodiments, a battery module including the lithium secondary battery as a single cell and a battery pack including the same may be provided.

The battery module or battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

The shape of the lithium secondary battery according to the present invention is not particularly limited, but may be a cylindrical type using a can, a prismatic type, a pouch type, or a coin type.

The lithium secondary battery according to the present invention may not only be used in a battery cell used as a power of a small device, but also preferably used as a unit battery in middle-to-large battery modules including a plurality of battery cells.

Hereinafter, for clarity, the present invention will be described in further detail with reference to examples and experimental examples, but is not limited to the examples and experimental examples. However, the present invention may be implemented in a variety of different forms, and is not limited to the embodiments described herein. Examples of the present invention will be provided to more completely explain the present invention to those of ordinary skill in the art.

EXAMPLES AND COMPARATIVE EXAMPLES

Example 1

1. Formation of Negative Electrode Mixture Layer

As a negative electrode active material, a mixture of graphite and SiO in a weight ratio of 7:3 was prepared. Afterward, a negative electrode active material slurry was prepared by mixing the negative electrode active material, Denka black (conductive material), SBR (binder) and CMC (thickening agent) in a weight ratio of 92:3:3.5:1.5, and then a negative electrode mixture layer was formed by coating one surface of a copper current collector (size: 10 cm×20 cm) with the negative electrode mixture slurry and drying the coated negative electrode mixture slurry. At this time, the temperature of circulating air was 80° C. Subsequently, a negative electrode was prepared through roll pressing and drying in a vacuum oven at 130° C. for 12 hours.

2. Disposition of Lithium Metal Powder

A pattern shape having a thickness of 70 μm was disposed by spraying lithium metal powder having an average particle size ($D_{50}$) of 40 μm on the negative electrode mixture layer on which a window having a square-shaped pattern (size: 5 mm×5 mm) at an interval of 3 mm was disposed, and then removing the window. The area of the disposed lithium metal powder was 60% of the total area of the negative electrode mixture layer.

In addition, the lithium metal powder was disposed at 5 parts by weight with respect to 100 parts by weight of the negative electrode mixture layer.

3. Pressing, Wetting with First Electrolyte Solution, and Drying

The lithium metal powder-disposed negative electrode mixture layer was roll-pressed under a nip pressure of 5 kN/cm.

Afterward, the pressed negative electrode mixture layer and a negative electrode current collector were wetted with an 1M LiPF$_6$ solvent prepared by mixing ethylene carbonate (EC) and ethylmethyl carbonate (EMC) in a volume ratio of 50:50 (first electrolyte solution).

About 120 minutes later, the negative electrode was taken out from the electrolyte solution, washed with DMC and then dried in a vacuum oven at 40° C. for 1 hour, thereby preparing a negative electrode.

4. Production of Lithium Secondary Battery

A coin-type half cell was produced by punching the prepared negative electrode for a lithium secondary battery to a coin-cell size, interposing a polyolefin separator in-between lithium metal foil, which is a counter electrode, and injecting an electrolyte solution (second electrolyte solution) in which 1M LiPF$_6$ was dissolved in a solvent prepared by mixing EC and EMC in a volume ratio of 50:50.

Example 2

A negative electrode for a lithium secondary battery was prepared by the same method as described in Example 1, except that the average particle size (D$_{50}$) of the disposed lithium metal powder was 5 μm.

Example 3

A negative electrode for a lithium secondary battery was prepared by the same method as described in Example 1, except that the average particle size (D$_{50}$) of the disposed lithium metal powder was 150 μm.

Example 4

A lithium secondary battery was produced by the same method as described in Example 1, except that the area of the disposed lithium metal powder was 30% of the total area of the negative electrode mixture layer.

Example 5

A lithium secondary battery was produced by the same method as described in Example 1, except that the area of the disposed lithium metal powder was 97% of the total area of the negative electrode mixture layer.

Example 6

A lithium secondary battery was produced by the same method as described in Example 1, except that lithium metal powder was applied and disposed on the entire surface of the negative electrode mixture layer without a patterning process.

Example 7

A lithium secondary battery was produced by the same method as described in Example 1, except that the area of the disposed lithium metal powder was 25% of the total area of the negative electrode mixture layer.

Example 8

A lithium secondary battery was produced by the same method as described in Example 1, except that that the area of the disposed lithium metal powder was 75% of the total area of the negative electrode mixture layer.

Example 9

A lithium secondary battery was produced by the same method as described in Example 1, except that the area of the disposed lithium metal powder was 85% of the total area of the negative electrode mixture layer.

Comparative Example 1

A lithium secondary battery was produced by the same method as described in Example 1, except that pre-lithiation by the lithium metal powder was not performed.

Comparative Example 2

A negative electrode for a lithium secondary battery was prepared by the same method as described in Example 1, except that the lithium metal powder was disposed, and then roll-pressing was performed without wetting with the first electrolyte solution according to the present invention.

Afterward, an electrode assembly was prepared by interposing a polyolefin separator between the negative electrode for a lithium secondary battery and lithium metal foil, which is a counter electrode, and a lithium secondary battery was produced by injecting an electrolyte solution in which 1M LiPF6 was dissolved in a solvent prepared by mixing EC and EMC in a volume ratio of 50:50 into each of the negative electrode for a lithium secondary battery and the lithium metal foil.

Experimental Example

The lithium secondary batteries produced in Examples and Comparative Examples were subjected to a charge/discharge reversibility test using an electrochemical charger/discharger. For charging, a current was applied at a current density of 0.1 C-rate up to a voltage of 0.005 V (vs. Li/Li+), and discharging was performed at the same current density as used for charging up to a voltage of 1.5 V. Here, 1) an initial reversibility test was performed in the ratio (%) of discharge capacity to charge capacity at the first cycle, and 2) a 100-cycle capacity retention was measured according to Equation 1 below, and thus the results are shown in Table 1 below.

100-cycle capacity retention (%)=(discharge capacity of lithium secondary battery at the 100$^{th}$ cycle)/ (discharge capacity of lithium secondary battery at the first cycle)×100  [Equation 1]

TABLE 1

|  | Initial reversibility test (%) | 100-cycle capacity retention (%) |
| --- | --- | --- |
| Example 1 | 98 | 91 |
| Example 2 | 95 | 87 |
| Example 3 | 93 | 86 |
| Example 4 | 92 | 83 |
| Example 5 | 91 | 82 |
| Example 6 | 89 | 79 |
| Example 7 | 91 | 81 |

TABLE 1-continued

|  | Initial reversibility test (%) | 100-cycle capacity retention (%) |
|---|---|---|
| Example 8 | 94 | 85 |
| Example 9 | 92 | 83 |
| Comparative Example 1 | 80 | 65 |
| Comparative Example 2 | 97 | 72 |

Referring to Table 1, compared with Comparative Examples, Examples in which wetting with the electrolyte solution and drying were performed in the preparation of the negative electrode, without performing the pre-lithiation after the preparation of the electrode assembly, exhibited excellent results of the initial reversibility test and excellent cycle characteristics.

Compared with Example 1, Example 2 using the lithium metal powder having the slightly smaller average particle size ($D_{50}$) exhibited slightly degraded performance in the initial reversibility test and the cycle capacity retention. It is assumed that since the surface area of the lithium metal powder used in Example 2 is slightly large, a side reaction occurs, thereby lowering a degree of pre-lithiation.

Compared with Example 1, in Example 3 using the lithium metal powder having the slightly larger average particle size ($D_{50}$), the charge/discharge characteristics and the cycle characteristic were slightly degraded due to a decrease in degree of ionization by the average particle size.

Compared with Example 1, in Examples 4, 5 and 7 to 9 in which the coating areas of the lithium metal powder were slightly smaller or larger, slightly degraded performance was exhibited in terms of the initial reversibility test and the cycle capacity retention, and it is considered that this is because the coating area is excessively small or large, resulting in a slight reduction in uniformity of pre-lithiation.

In addition, compared with Example 1, Example 6 not experiencing a patterning process exhibited slightly degraded performance in terms of the initial reversibility test and the cycle capacity retention, and it is considered that this is because the lithium metal powder is not uniformly distributed in the pressing process due to slight agglomeration of the lithium metal powder, resulting in slight reduction in uniformity of pre-lithiation.

However, compared with Comparative Examples, Examples exhibited very excellent charge/discharge characteristics and an excellent cycle characteristic. Particularly, in Comparative Example 1, it can be seen that the charge/discharge characteristics and the cycle characteristic were significantly reduced without performing pre-lithiation, and in Comparative Example 2, it can be seen that, since pre-lithiation was performed by the process of injecting an electrolyte solution after the preparation of an electrode assembly, cell performance was greatly reduced due to the expansion of a void in a cell and cell distortion.

The invention claimed is:

1. A method of preparing a negative electrode for a lithium secondary battery, comprising:
    forming a negative electrode mixture layer on a negative electrode current collector, wherein the negative electrode mixture layer comprises a negative electrode active material, and wherein the negative electrode active material comprises a carbon-based material and a silicon-based material;
    disposing lithium metal powder on at least a part of the negative electrode mixture layer;
    pressing the negative electrode mixture layer on which the lithium metal powder is disposed;
    wetting the pressed negative electrode mixture layer with a first electrolyte solution; and
    drying the wet negative electrode mixture layer,
    wherein, in the disposition of the lithium metal powder, the lithium metal powder is disposed on at least a part of the negative electrode mixture layer in two or more pattern shapes, wherein each pattern shape is spaced apart from another pattern shape, and
    wherein the area in which the lithium metal powder is disposed on the negative electrode mixture layer is 50 to 70% with respect to a total area of a surface of the negative electrode mixture layer, and
    an average particle size ($D_{50}$) of the lithium metal powder is 30 to 50 μm.

2. The method according to claim 1, wherein a thickness of each of the pattern shapes is 10 to 200 μm.

3. The method according to claim 1, wherein, in the disposition of the lithium metal powder, the lithium metal powder is disposed, on at least a part of the negative electrode mixture layer, at 3 to 50 parts by weight with respect to 100 parts by weight of the negative electrode mixture layer.

4. The method according to claim 1, wherein the carbon-based material is one or more selected from a group consisting of crystalline artificial graphite, crystalline natural graphite, amorphous hard carbon, low crystalline soft carbon, carbon black, acetylene black, Ketjen black, Super P, graphene, and fibrous carbon.

5. The method according to claim 1, wherein the silicon-based material is $SiO_x$, wherein $0 \leq x < 2$.

6. A method of producing a lithium secondary battery, comprising:
    preparing a negative electrode for a lithium secondary battery according to claim 1;
    preparing a positive electrode for a lithium secondary battery; and
    interposing a separator between the negative electrode for a lithium secondary battery and the positive electrode for a lithium secondary battery.

7. The method according to claim 6, further comprising:
    injecting a second electrolyte solution into the negative electrode for a lithium secondary battery and the positive electrode for a lithium secondary battery.

* * * * *